May 1, 1928. 1,667,850
G. H. GIBSON
METHOD OF AND APPARATUS FOR HEATING AND DEAERATING WATER
Filed June 16, 1923 3 Sheets-Sheet 1
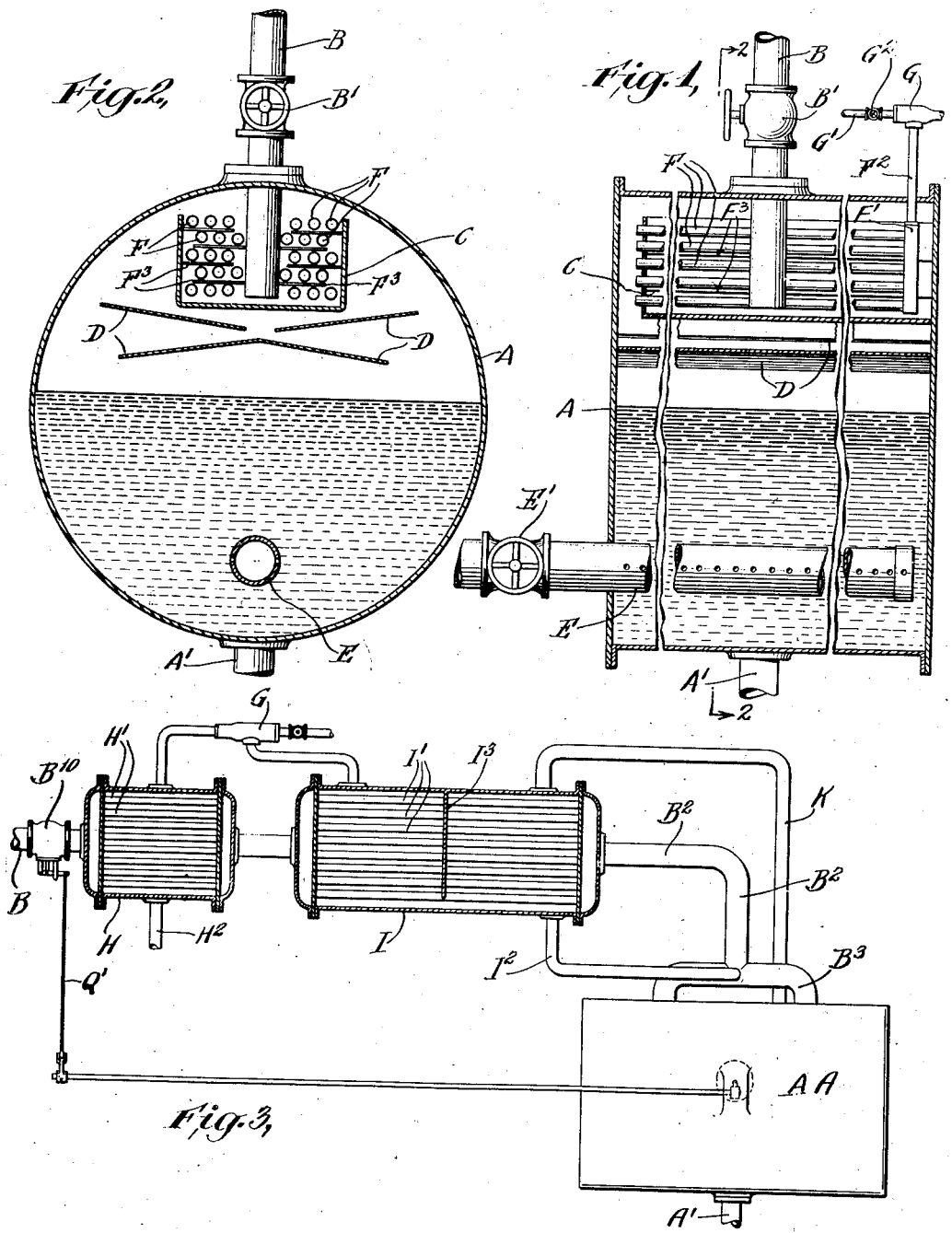
INVENTOR
Geo H Gibson
BY
John E Hubbell
ATTORNEY May 1, 1928.
G. H. GIBSON
1,667,850
METHOD OF AND APPARATUS FOR HEATING AND DEAERATING WATER
Filed June 16, 1923   3 Sheets-Sheet 3
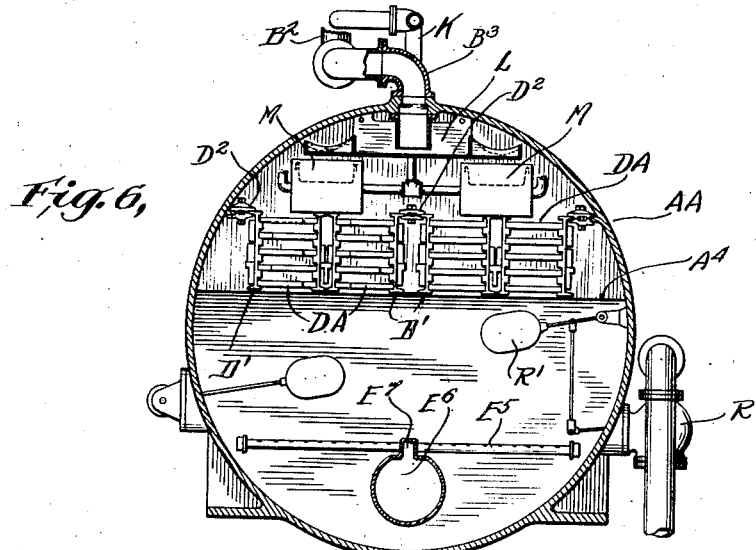
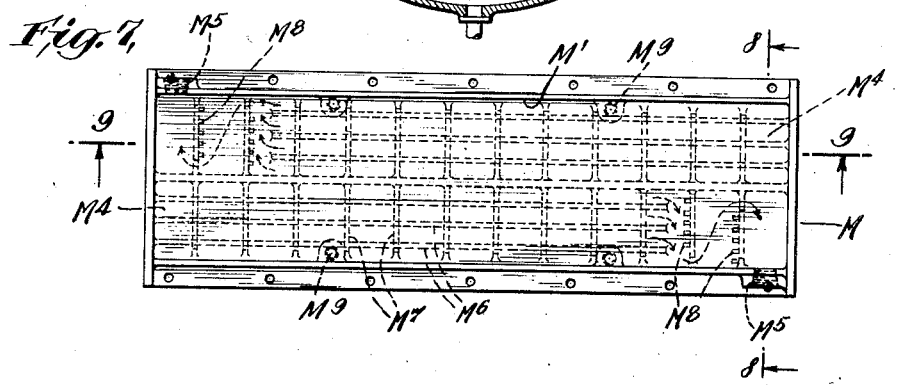
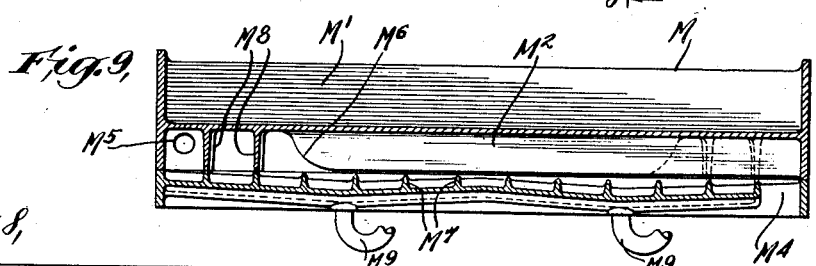
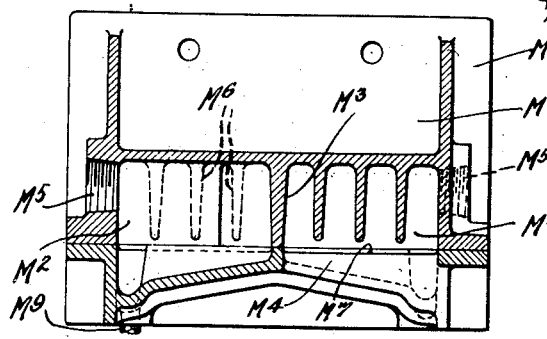
INVENTOR
Geo H. Gibson
BY John E. Hubbell
ATTORNEY Patented May 1, 1928.

1,667,850

UNITED STATES PATENT OFFICE.

GEORGE H. GIBSON, OF MONTCLAIR, NEW JERSEY, ASSIGNOR TO COCHRANE CORPORATION, OF PHILADELPHIA, PENNSYLVANIA, A CORPORATION OF PENNSYLVANIA.

METHOD OF AND APPARATUS FOR HEATING AND DEAERATING WATER.

Application filed June 16, 1923. Serial No. 645,934.

The general object of my present invention is to provide an improved method of, and improved apparatus for heating and deaerating water. More specifically the object of my invention is to provide a method and apparatus characterized by their simplicity and effectiveness, for utilizing steam which may, and ordinarily will be, exhaust steam, in deaerating boiler feed water and heating it to the comparatively moderate temperatures desired, which, when the water is passed to the boiler through an economizer, as is frequently the case, is ordinarily somewhat below 212°.

My improved method involves the use of a closed heat exchanger through which the water is passed into a deaerating chamber, and in which it is heated by steam drawn through the deaerating chamber and the air carried out of the deaerating chamber with the steam. By the term "closed heat exchanger", I mean a device in which heat is transferred from one fluid to another without contact between the two fluids; and by the term "deaerating chamber", I mean a closed chamber through which the liquid to be deaerated is passed and which comprises a vapor space into which air may escape from the water passing through the chamber.

The idea of employing a closed heat exchanger in conjunction with a deaerating chamber to transfer heat from the air and vapor mixture leaving the chamber to the water passing to the chamber is not a novel one, but my invention is distinguished from the arrangements and methods heretofore proposed and used, in that I heat the water in the heat exchanger approximately to the desired delivery temperature and pass the water through the deaerating chamber without appreciable change in temperature therein. By proceeding in this manner all of the steam passing through the deaerating chamber may be effectively utilized in scrubbing air out of the water, and in sweeping the air out of the chamber. Furthermore, since the temperature of the water in all portions of the deaerating chamber is above that at which it will hold air in solution, there is no tendency for the water in one portion of the deaerating chamber to redissolve air liberated in another portion of the deaerating chamber, as is the case in deaerating chambers in which the water is progressively heated through a substantial temperature range as it passes in film-like and broken streams through the vapor space of the deaerating chamber.

The novel apparatus forming a part of the present invention is well adapted for the treatment of relatively large volumes of water in accordance with my improved method, but some of its novel features of construction and arrangement are not limited to such use.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated preferred embodiments of my invention.

Of the drawings:

Fig. 1 is a sectional elevation of one form of apparatus;

Fig. 2 is a section on the line 2—2 of Fig. 1;

Fig. 3 is a somewhat diagrammatic view of a modified form of apparatus;

Fig. 6 is a partial section on the line 6—6 of Fig. 4;

Fig. 7 is a plan view of a water box distributor;

Fig. 8 is a section on the line 8—8 of Fig. 7; and

Fig. 9 is a section on the line 9—9 of Fig. 7.

Figure 4:
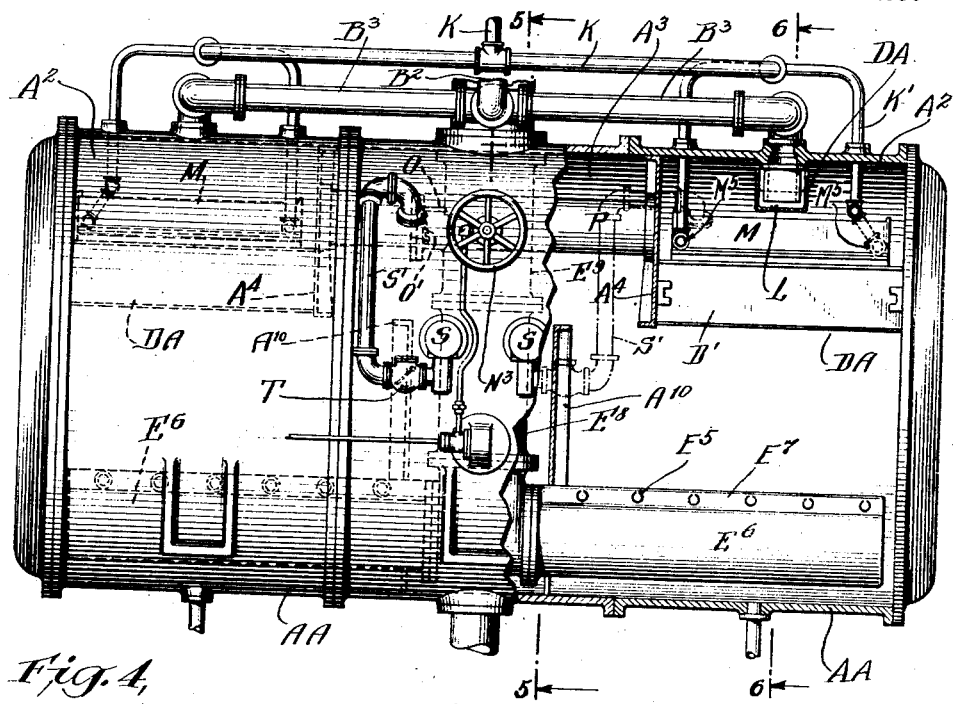
Fig. 4 is an elevation, partly in section, of the deaeration chamber of Fig. 3.

The apparatus illustrated somewhat diagrammatically and conventionally in Figs. 1 and 2 of the drawings, comprises a deaerating chamber A generally like an open feed water heater, in that the water treated passes through a vapor space containing trays or baffles D in the upper portion of the chamber in film-like or broken streams from a water distributing box C to which the water to be treated passes through a water supply pipe B. A' represents the outlet for the heated and deaerated water from the water storage space formed by the lower portion of the chamber A.

Steam is injected into the chamber A through a spray pipe E located beneath the normal water level in the chamber. The water box C is traversed by a series of tubes F each of which is open at one end of the box to the vapor space in the chamber A and at the other end of the box C, the tubes are connected into a header or chamber F', from which a pipe $F^2$ runs to an air exhausting device shown as a steam ejector G, G' representing a live steam supply connection to the ejector. Baffles $F^3$ cause the water supplied to the box C through the supply pipe B, to pass back and forth across the tubes F to the top of the box from which it overflows on to the baffles D. The rate of water supply may be regulated by the valve B', the rate of steam supply may be regulated by the valve E', and the suction exerted on the chamber F' through the pipe $F^2$ may be regulated by the injector steam supply valve $G^2$. In the apparatus shown in Figs. 1 and 2, the water box C and pipes F form a closed heat exchanger, which, while located within the shell of the deaerating chamber, is practically as separate and distinct from the latter, in its operation, as it would be if located in a separate casing exterior to the deaerating chamber.

In using the apparatus shown in Figs. 1 and 2 in the practice of my novel method, steam is passed through the deaerating chamber and into the pipes F of the heat exchanger at such pressure and in such quantity, that the water will be heated in the box C approximately to the temperature of the steam in the vapor space of the deaerating chamber A. In consequence, practically none of the steam passed into the deaerating chamber through the spray pipe is condensed in the chamber proper, so that all of the steam is effectively utilized in scrubbing the water as the steam passes through the body of water in the lower storage space portion of the deaerating chamber and passes through the vapor portion of the chamber in contact with the broken and film-like streams of water flowing down from the box C. This insures a comparatively large deaerating effect for apparatus of a given bulk. The temperature maintained in the deaerating chamber will vary with conditions and may be either above or below 212° F., but in practice will not ordinarily be below 140° to 160° F. The efficiency of the deaerating effect is enhanced, moreover, by the fact that water overflowing from the box C is already heated to a temperature at which it will not hold a significant amount of air in solution and its air content is mainly in the form of minute entrained bubbles. In consequence there is no tendency for the water flowing through the upper portion of the vapor space to redissolve air liberated from the water in a lower portion of the deaerating chamber, as exists when the water is progressively heated through a substantial temperature range as it passes downward through the vapor space of the deaerating and heating chamber. With properly designed apparatus, all but a small portion of the steam entering the pipes F will be condensed in the latter and will drain back into the deaerating chamber while the air will be cooled down to a temperature approximately that at which the water enters the water box thereby reducing the required size and energy consumption of the air exhauster G, and reducing the amount of heat carried out of the deaerating chamber by the mixture of air and uncondensed vapor passing to the exhauster.

Those skilled in the art will understand that the simple form of heat exchanger illustrated diagrammatically in Figs. 1 and 2, is not well adapted to effect the desired heat exchange between the water and the air and vapor mixture admitted to the tubes F in units of commercial size, unless made unduly large, and that in practice other known and more efficient forms of heat exchange apparatus would ordinarily be employed.

Figure 5:
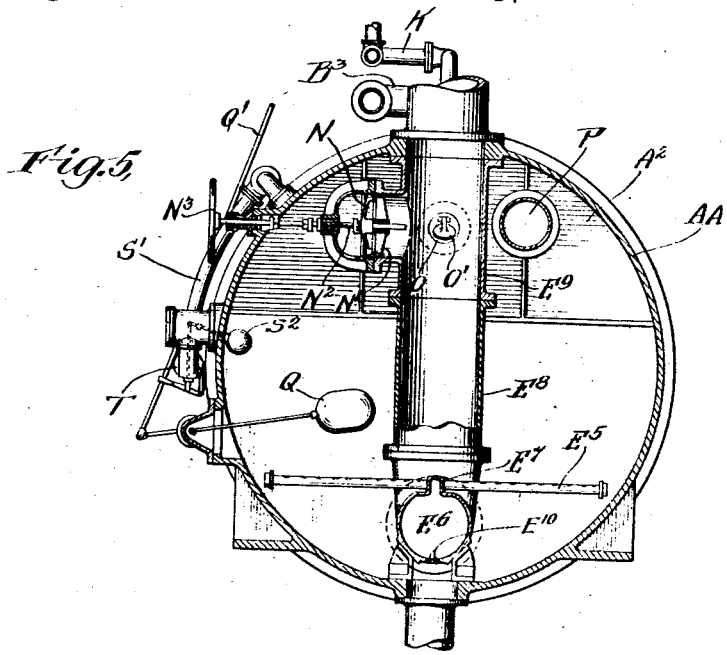
Fig. 5 is a section on the line 5—5 of Fig. 4.

In Figs. 3 to 9, I have illustrated one of various commercially practical forms of apparatus which may be employed in large size units to carry out my method. As illustrated somewhat diagrammatically in Fig. 3, the water supply pipe B delivers water to a tubular final air cooler H, and after traversing the tubes H' of the cooler H, the water passes through the tubes I' of a tubular precooler and condenser I and thence through a pipe $B^2$ and its branches $B^3$, to the water inlets of a deaerating chamber AA. Air and vapor pass from the chamber AA through piping K to the intertube space of the precooler I, which has an air and vapor outlet connected to the suction chamber of the steam ejector G which discharges into the intertube space of the final air cooler H. The latter has an outlet $H^2$ to the atmosphere for air and for any water of condensation formed therein. Water of condensation formed in the precooler I passes through the drain connection $I^2$ back into the deaerating chamber. As shown the precooler I is provided with a baffle $I^3$ dividing the intertube space into two passes across the tubes I'.

With the arrangement shown diagrammatically in Fig. 3, the water treated may be progressively heated up approximately to the temperature at which it leaves the deaerating chamber AA, through the outlet A' in the passage of the water through the final cooler H and precooler I. In practice, however, I prefer to provide for a partial water heating effect and corresponding cooling effect of the air and vapor mixture by means of the special water distributing boxes M shown in detail in Figs. 7, 8, and 9, and hereinafter described.

The particular deaerating chamber AA shown in detail in the drawings comprises a horizontally disposed cylindrical shell, the upper portion of the vapor space in which is divided into two end compartments $A^2$ and an intermediate compartment $A^3$ by transverse partitions $A^4$, the lower edges of which are located above the normal water level in the chamber. In each of the end compartments $A^2$ are located water spreading baffles or trays DA. As shown there are four sets or banks of trays DA in each end compartment. The trays DA extend the full length of the compartment $A^2$ in which they are located, and each set or bank of trays are mounted in slotted vertical tray guides D' which extend between the corresponding end wall of the deaerating chamber and the adjacent partition $A^4$ and are suitably supported and connected to the shell of the chamber AA and connected together as indicated at $D^2$ so that the only vapor and air path between the portion of the vapor space above the trays and the portion of the vapor space below the trays in each end compartment $A^2$, is a zigzag path through the tray banks generally counter to the direction of flow of the water over the trays. One branch $B^3$ of the water supply piping opens to the top of each compartment $A^2$ into a bridge member or primary distributing box L which passes the water in equal portions to two distributing boxes M located each centrally over a corresponding pair of the tray banks so that the water overflowing from each side edge of each box M passes down on to a corresponding tray bank.

The boxes M, in the preferred construction illustrated, are each formed with an upper water receiving cavity or trough M', and two lower air cooling and vapor condensing chambers $M^2$ beneath the water trough M' and separated by a longitudinal partition $M^3$. One of the chambers $M^2$ is open at one end through a port $M^4$ in its bottom wall to the vapor space within the deaerating chamber, and at its opposite end is connected through a port $M^5$ to a corresponding branch K' of the air and vapor discharge piping K. Ribs $M^6$ extending longitudinally of the boxes M depend from the top wall of each chamber $M^2$ and serve to increase the heat absorption from the air and vapor mixture as it passes through the chamber. Transverse ribs $M^7$ on the bottom walls of the chambers $M^2$ break up the streams of the air and vapor mixture and thus tend to increase the heat transfer. Transverse ribs $M^8$ adjacent the outlet $M^5$ from each chamber $M^2$ give a sort of steam and water separating effect thereby reducing the amount of entrained moisture carried out of the boxes with the air and vapor mixture passing to the piping K. Suitable drainage provisions for water of condensation formed in the chamber $M^2$ are provided. As shown these provisions comprise water sealed drain pipe connections $M^9$ opening through the bottom wall of each chamber $M^2$ which slopes both longitudinally and transversely to the drainage openings.

Steam is normally injected in the deaerating chamber below the water level therein through horizontal spray pipes $E^5$ connected to steam supply pipes $E^6$. As shown each steam supply pipe $E^6$ is in the form of a casting provided with a hollow rib $E^7$ at its upper side into the side walls of which the corresponding spray pipes $E^5$ are threaded. There are two pipes $E^6$ each connected to the lower end of a pipe $E^8$ which is vertically disposed in the central compartment $A^3$ and passes through the top wall of the chamber AA. Advantageously the pipes $E^6$ are provided each with one or more restricted drain openings $E^{10}$ (see Fig. 5). The upper portion of the piping $E^8$ comprises a T section $E^9$, flow through the lateral outlet of which is controlled by a valve member N. The valve N may be moved toward and away from its seat N' by rotating its threaded spindle $N^2$ which extends through the wall of the chamber AA and is provided at its outer end with a hand wheel $N^3$. Steam passing through the valve N when the latter is open passes from the central compartment $A^3$ into the end compartments $A^2$ beneath the partitions $A^4$. Baffles $A^{10}$ may advantageously be arranged as shown to extend across the deaerating chamber from a level above the normal water level nearly to the bottom of the chamber to compel the water from the spray banks to pass in proximity with the steam spray pipes before passing to the water outlet and to restrict fluctuation in water level in the central portion of the apparatus which might be prejudicial to the operation of the various control floats.

A port O is formed in the wall of the pipe $E^8$ well above the normal water level in the chamber and this port is normally closed by a check valve O' which opens inwardly when the pressure in the steam pipe falls below the pressure in the heating chamber. This port and valve prevent water being sucked out of the deaerating chamber through the steam supply pipe $E^8$, if, as may occasionally happen through some disturbance in the regular operating conditions, the pressure in the supply piping $E^8$ temporarily falls below the pressure in the deaerating chamber.

To avoid any inequalities in vapor pressure in the upper ends of the two compartments $A^2$, these compartments are connected by a large vapor equalizing pipe P extending between the partitions $A^4$, which are formed with ports in register with the pipe. The valve $B^{10}$ controlling the supply of water to the apparatus, is automatically opened and closed by a float Q through connections Q' as required to normally maintain an approximately constant height of water level in the deaerating chamber. As a further means for limiting the maximum height of water level, an overflow outlet valve R is provided. A float R' opens the valve R when the water level in the deaerating chamber reaches a predetermined height.

To enable the overflow valve R to function, it is necessary to restore atmospheric pressure within the deaerating chamber AA. The means shown for this purpose comprise two vacuum breaker valves S connected by corresponding pipes S', one to compartment $A^3$, and the other to one of the compartments $A^2$ above the tray banks therein. Each valve S is provided with a float $S^2$ which opens the valve and permits atmospheric air to enter the corresponding compartment when the level of the water within the deaerating chamber lifts sufficiently to raise the float $S^2$. A check valve T in each pipe S' prevents the outflow of steam through the pipes S' in case the deaerating chamber is operated at pressures higher than atmospheric pressure.

In the contemplated mode of operation of the apparatus shown in Figs. 3 to 9, water is passed into the deaerating chamber AA as required to supply the demand for deaerated water, and maintain an approximately constant height of water level in the water storage space of the deaerating chamber; and steam is supplied to the deaerating chamber as required to maintain the desired temperature conditions therein. For example, the steam supply pipe $E^8$ may be connected to an adequate source of exhaust steam supply at a pressure equal to the vapor pressure which it is desired to maintain above the body of water in the chamber AA, plus the head required to drive the steam through the body of water in which the spray pipes $E^5$ are immersed. Under these conditions, the supply of steam to the deaerating chamber will automatically increase and decrease as the amount of water supplied varies, for when the rate at which water is supplied increases, the increased steam condensing effect of the water tends to produce a higher vacuum in the vapor space of the deaerating chamber and correspondingly increases the supply of steam, and when the rate of water supply diminishes, the decreased condensing effect of the water tends to increase the pressure in the vapor space of the deaerating chamber and correspondingly decrease the rate at which steam is supplied.

The provision of the air and vapor cooling chambers $M^2$ in the bottoms of the water distributing boxes M' permits of a substantial and highly efficient heat transfer between the water and the air and vapor mixture, without contact between the two fluids and consequent risk of reabsorption of air by the water. The special deaerating chamber construction with the separated vapor compartments $A^2$ and with the steam supply piping in the central compartment $A^3$ whether used in accordance with the novel method disclosed herein, or in accordance with other methods of heating and deaerating water, is an advantageous one for large units and with practically the same length of steam supply piping and the same number of control valves as would be required for a single unit.

While in accordance with the provisions of the statutes I have illustrated and described the best forms of my invention now known to me, it will be apparent to those skilled in the art that changes in form may be made without departing from the spirit of my invention as set forth in the appended claims and that certain features of my invention may sometimes be used with advantage without a corresponding use of other features.

Having now described my invention, what I claim as new and desire to secure by Letters Patent, is:

1. The method of heating and deaerating water which consists in passing the water through a deaerating chamber, passing steam into said chamber to scrub the water therein, withdrawing the steam and liberated air from the chamber and transferring heat from the steam and air to the water passing into the chamber without contact of the water with the steam and air to heat the water approximately to the temperature maintained in said chamber, and to thereby condense the steam and cool the air admixed with it.

2. Water heating and deaerating apparatus comprising the combination with a horizontally elongated water deaerating chamber and provisions for supplying water to and withdrawing it from said chamber so as to maintain a vapor space in the upper portion of the chamber, of partitions depending from the top wall of said chamber and dividing the upper portion of said vapor space into two end compartments and an intermediate compartment, said end compartments having air outlets and said provisions including means for introducing the water to be treated partly into the upper portion of one end compartment, and partly into the upper portion of the other end compartment, and means for supplying steam to the chamber comprising a steam supply pipe extending through the wall of the chamber and downwardly through the intermediate compartment, and provided at its lower end with spray pipe extensions running toward each end of the chamber and located below the normal water level in said chamber.

3. The combination with a horizontally elongated water deaerating chamber and provisions for supplying water to and withdrawing it from said chamber so as to maintain a vapor space in the upper portion of the chamber, of partitions depending from the top wall of said chamber and dividing the upper portion of said vapor space into two end compartments and an intermediate compartment, said end compartments having air outlets and said provisions including means for introducing the water to be treated partly into the upper portion of one, and partly into the upper portion of the other of said end compartments, and means for supplying steam to the chamber comprising a steam supply pipe extending through the wall of the chamber and downwardly through the intermediate compartment, and provided at its lower end with spray pipe extensions running toward each end of the chamber and located below the normal water level in said chamber, said supply pipe being provided with a valved outlet to said intermediate compartment above the normal liquid level in the chamber.

4. The combination with a horizontally elongated water deaerating and heating chamber and provisions for supplying water to and withdrawing it from said chamber so as to maintain a vapor space in the upper portion of the chamber, of partitions depending from the top wall of said chamber and dividing the upper portion of said vapor space into two end compartments and an intermediate compartment, said end compartments having air outlets and said provisions including means for introducing the water to be treated partly into the portion of one and partly into the upper portion of the other of said end compartments, and means for supplying steam to the chamber comprising a steam supply pipe, extending through the wall of the chamber and downwardly through the intermediate compartment, and provided at its lower end with spray pipe extensions running toward each end of the chamber and located below the normal water level in said chamber, said supply pipe being provided with a port located above the water level in the chamber and normally closed by a non-return valve opening to permit flow into the pipe from said intermediate compartment through said port and closing to prevent flow through the port in the opposite direction.

5. The combination with a horizontally elongated water deaerating chamber and provisions for supplying water to and withdrawing it from said chamber so as to maintain a vapor space in the upper portion of the chamber, of partitions depending from the top wall of said chamber and dividing the upper portion of said vapor space into two end compartments and an intermediate compartment, said provisions including means for introducing the water to be treated partly into the upper portion of one and partly into the upper portion of the other of said end compartments, means located in each end compartment for causing the water to flow downwardly through the latter in divided streams and compelling air and vapor passing upward through said end compartments to follow a path of flow traversed by said streams, means for injecting steam into said chamber below the water level therein, means for drawing air and vapor from the tops of said end compartments and a vapor pressure equalizing connection between said two end compartments.

6. In apparatus for heating and deaerating water comprising a chamber through which the water is passed and in which a vapor space is maintained and means for supplying steam to said chamber, the improvement which consists in a closed heat exchanging and water distributing device located in said vapor space and provided with a water holding space into which the water to be treated is passed and from which it overflows and with an air and vapor space which is separated from said water holding space by a heat conducting wall and forms a conduit through which air and uncondensed vapor are withdrawn from said chamber.

7. In apparatus for heating and deaerating water comprising a chamber through which the water is passed and in which a vapor space is maintained and means for supplying steam to said chamber, the improvement which consists in a water distributing trough located in said vapor space, and formed with an air space in its wall through which air and uncondensed vapor is withdrawn from said vapor space.

8. A water distributor for an open deaerating water heater in the form of a metal trough having an air and vapor space in its wall divided into two channels extending longitudinally of the trough and each having an inlet port at one end and an outlet port at its opposite end, the inlet ports for the two channels being at opposite ends of the distributor.

9. A water distributor for an open deaerating water heater in the form of a metal trough having an air and vapor space in its wall, and inlet and outlet ports therefor spaced to compel air and vapor to pass longitudinally of the trough in passing from the inlet port to the outlet port, and transverse liquid and vapor separating baffles located in said space adjacent said outlet port.

10. A water distributor for an open deaerating water heater in the form of a metal trough having an air and vapor space in its wall, and inlet and outlet ports therefor spaced to compel air and vapor to pass longitudinally of the trough in passing from the inlet port to the outlet port, and water sealed drainage outlets from said space for the liquid of condensation formed therein.

11. A water distributor for an open deaerating water heater in the form of a metal trough having an air and vapor space in its wall, and inlet and outlet ports therefor spaced to compel air and vapor to pass longitudinally of the trough in passing from the inlet port to the outlet port, and integral rib portions of said wall projecting into said space to increase the heat transfer between the air and vapor passing through the space and the water in the trough.

12. A water distributor of an open deaerating water heater in the form of a one piece cast metal trough part and a second part secured to the bottom wall of the trough and uniting therewith to form an air and vapor space beneath the water holding space of the trough with spaced apart inlet and outlet ports opening to said space and with liquid and vapor separating ribs in said space formed on one of said parts and extending transversely to the path of flow between said parts.

13. Apparatus for heating and deaerating water comprising a deaerating chamber, means for withdrawing heated deaerated water therefrom, means for passing steam into the chamber to scrub the water therein, and means for supplying water to be treated to said chamber and for withdrawing steam and liberated air from said chamber including closed heat exchanging apparatus by which heat is transferred from the steam and air withdrawn from the chamber to the water passing into the chamber and which is of sufficient heat transfer capacity to thereby heat the water to a temperature approximately the same as that of the steam in said chamber under normal full load conditions.

14. In apparatus for heating and deaerating water comprising a chamber through which the water is passed and in which a vapor space is maintained and means for supplying steam to said chamber, the improvement which consists in a water distributing trough located in said vapor space, and formed with an air space in its bottom wall through which air and uncondensed vapor is withdrawn from said vapor space.

Signed at Philadelphia in the county of Philadelphia and State of Pennsylvania this eleventh day of June A. D. 1923.

GEORGE H. GIBSON.